US011520221B2

(12) United States Patent
Pan

(10) Patent No.: US 11,520,221 B2
(45) Date of Patent: Dec. 6, 2022

(54) ILLUMINATION SYSTEM, ILLUMINATION CONTROL METHOD AND PROJECTION APPARATUS

(71) Applicant: Coretronic Corporation, Hsin-Chu (TW)

(72) Inventor: Haw-Woei Pan, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 0 days.

(21) Appl. No.: 17/211,839

(22) Filed: Mar. 25, 2021

(65) Prior Publication Data

US 2021/0302819 A1 Sep. 30, 2021

(30) Foreign Application Priority Data

Mar. 30, 2020 (CN) ......................... 202010234511.5

(51) Int. Cl.

| | |
|---|---|
| ***G03B 21/20*** | (2006.01) |
| ***G02B 27/28*** | (2006.01) |
| ***G02B 27/10*** | (2006.01) |
| ***G03B 33/12*** | (2006.01) |
| ***G03B 33/08*** | (2006.01) |

(52) U.S. Cl.

CPC ......... *G03B 21/204* (2013.01); *G02B 27/102* (2013.01); *G02B 27/1006* (2013.01); *G02B 27/283* (2013.01); *G03B 21/206* (2013.01); *G03B 21/2013* (2013.01); *G03B 21/2053* (2013.01); *G03B 21/2066* (2013.01); *G03B 21/2073* (2013.01); *G03B 33/12* (2013.01); *G03B 21/2033* (2013.01); *G03B 33/08* (2013.01)

(58) Field of Classification Search

CPC .............. G02B 27/1006; G03B 21/204; G03B 21/283; G03B 21/2003; G03B 33/12

See application file for complete search history.

(56) References Cited

U.S. PATENT DOCUMENTS

| | | | | |
|---|---|---|---|---|
| 2012/0140183 | A1 | 6/2012 | Tanaka et al. | |
| 2014/0111967 | A1 | 4/2014 | Rehn | |
| 2018/0224732 | A1* | 8/2018 | Tian | H04N 9/3114 |

(Continued)

FOREIGN PATENT DOCUMENTS

| | | |
|---|---|---|
| CN | 1800912 | 7/2006 |
| CN | 103424971 | 12/2013 |
| CN | 104641289 | 5/2015 |

(Continued)

*Primary Examiner* — Keith G. Delahoussaye
(74) *Attorney, Agent, or Firm* — JCIPRNET

(57) ABSTRACT

An illumination system, an illumination control method and a projection apparatus are provided. The illumination system includes a first laser light source providing a first laser beam, and a light splitting module. When the first laser beam is incident to the light splitting module, a first portion of the first laser beam penetrates through the light splitting module, a second portion is reflected by the light splitting module. In the first illumination mode, the first laser beam is incident to the first light splitting region to form a first proportion of the first portion and the second portion. In the second illumination mode, the first laser beam is incident to the first light splitting region to form a second proportion of the first portion and the second portion, wherein the first proportion and the second proportion are different.

21 Claims, 10 Drawing Sheets

(56) References Cited

U.S. PATENT DOCUMENTS

| | | | | |
|---|---|---|---|---|
| 2018/0343425 | A1* | 11/2018 | Liao | H04N 9/3158 |
| 2019/0268578 | A1* | 8/2019 | Koizumi | G02B 27/283 |

FOREIGN PATENT DOCUMENTS

| | | | | |
|---|---|---|---|---|
| CN | 204389864 | | 6/2015 | |
| CN | 104765238 | | 7/2015 | |
| CN | 104765238 | A * | 7/2015 | G02B 26/008 |
| CN | 105683833 | | 6/2016 | |
| CN | 105805691 | | 7/2016 | |
| CN | 106990657 | | 7/2017 | |
| CN | 107357125 | | 11/2017 | |
| CN | 206863466 | | 1/2018 | |
| CN | 209373337 | | 9/2019 | |
| CN | 209765253 | | 12/2019 | |
| JP | 2012137744 | | 7/2012 | |
| WO | 2014084489 | | 6/2014 | |
| WO | 2020012751 | | 1/2020 | |

* cited by examiner

1200A

1200B

ILLUMINATION SYSTEM, ILLUMINATION CONTROL METHOD AND PROJECTION APPARATUS

CROSS-REFERENCE TO RELATED APPLICATION

This application claims the priority benefit of China application serial no. 202010234511.5, filed on Mar. 30, 2020. The entirety of the above-mentioned patent application is hereby incorporated by reference herein and made a part of this specification.

BACKGROUND

Technical Field

The disclosure relates to an illumination system, an illumination control method and a projection apparatus, and particularly relates to an illumination system having a light splitting module, an illumination control method and a projection apparatus.

Description of Related Art

Recently, projection apparatuses based on solid-state light sources such as light-emitting diodes (LEDs) and laser diodes (LDs) gradually become popular in the market. Generally, excitation light emitted from the solid-state light sources may be converted by a wavelength conversion material on a wavelength conversion module in the projection apparatus to generate converted light with different colors. In order to satisfy the requirements of color performance, a color filter module is disposed on an optical path of the projection apparatus, and the converted light outputted from the wavelength conversion module may pass through the color filter module to obtain light with a predetermined color. A light valve modulates the color lights to produce an image beam, and the image beam is projected by the projection lens to the outside of the projection apparatus.

On the other hand, color temperature is a standard characteristic for measuring hues of various light sources, and a unit thereof is represented by a unit of absolute temperature (Kelvin, K). Generally, when the color temperature is changed from low to high, the corresponding color is changed from red yellow to white and then gradually changed to blue. For example, a hue of sunrise or sunset sunlight is closer to yellow light, and a color temperature thereof is about 2000K-3000K, and a hue of general noon sunlight is closer to white light, and a color temperature thereof is about 5500K. Since a change of the color temperature has the above relationship with a hue of a light beam, the color temperature is often used as a measurement index of a white color image of a display device. For example, a hue of a light beam with a color temperature of 10000K is bluish white, and a hue of a light beam with a color temperature of 3500K is yellowish white.

Further, in an optical design of a white color image of the projection apparatus, the white color image with a specific color temperature is usually used as a design reference to optimize a ratio of different optical parameters obtained from a light source, a wavelength conversion module, a dichroic optical element (a dichroic mirror, a color filter wheel or a dichroic prism) to achieve optimization of brightness. However, when the projection apparatus is changed to a display mode for another color temperature, a current providing to the light source is required to be appropriately reduced (by operating during different time period or by operating to different light source), so as to correspondingly change a color temperature of the white color image. For example, in order to increase the color temperature of the white color image, a current providing to a red light source or a green light source needs to be reduced for adjusting a ratio of different colors in the white light. However, as a result, the projection apparatus may lose a brightness of a display image is lost when the projection apparatus is operated in a display mode for other color temperature.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure is directed to an illumination system, which is capable of maintaining a certain brightness under illumination modes of different color temperatures.

The disclosure provides an illumination control method, which is adapted to control an illumination system to maintain a certain brightness under illumination modes of different color temperatures.

The disclosure provides a projection apparatus, which is capable of maintaining a certain brightness under illumination modes of different color temperatures.

Other objects and advantages of the disclosure may be further illustrated by the technical features broadly embodied and described as follows.

In order to achieve one or a portion of or all of the objects or other objects, an embodiment of the disclosure provides an illumination system. The illumination system is configured to provide an illumination beam, and includes a first laser light source, a wavelength conversion module and a light splitting module. The first laser light source is configured to provide a first laser beam. The wavelength conversion module is located on a transmission path of the first laser beam. The light splitting module is located on the transmission path of the first laser beam. When the first laser beam is incident to the light splitting module, a first portion of the first laser beam penetrates through the light splitting module, a second portion of the first laser beam is reflected by the light splitting module, and the light splitting module has a first light splitting region and a second light splitting region, and the first light splitting region and the second light splitting region of the light splitting module are respectively cut into the transmission path of the first laser beam, such that the illumination system is correspondingly switched to a first illumination mode and a second illumination mode. In the first illumination mode, the first light splitting region is cut into the transmission path of the first laser beam, so that the first laser beam is incident on the first light splitting region to form a first proportion of the first portion and the second portion, and in the second illumination mode, the second light splitting region is cut into the transmission path of the first laser beam, so that the first laser beam is incident on the first light splitting region to form a second proportion of the first portion and the second portion, wherein the first proportion and the second proportion are different.

In order to achieve one or a portion of or all of the objects or other objects, an embodiment of the disclosure provides an illumination control method, which is configured to control an illumination system in a projection apparatus. The illumination system includes a first laser light source and a light splitting module. The first laser light source is configured to provide a first laser beam. The light splitting module is located on a transmission path of the first laser beam and has a first light splitting region and a second light splitting region. When the first laser beam is incident to the light splitting module, a first portion of the first laser beam penetrates through the light splitting module, and a second portion of the first laser beam is reflected by the light splitting module. The illumination control method includes: in a first illumination mode, the first light splitting region of the light splitting module is controlled to cut into the transmission path of the first laser beam, so that the first laser beam is incident on the first light splitting region to form a first proportion of the first portion and the second portion; and in a second illumination mode, the second light splitting region of the light splitting module is controlled to cut into the transmission path of the first laser beam, so that the first laser beam is incident on the first light splitting region to form a second proportion of the first portion and the second portion. The first proportion and the second proportion are different.

In order to achieve one or a portion of or all of the objects or other objects, an embodiment of the disclosure provides a projection apparatus. The projection apparatus includes the aforementioned illumination system, at least two light valves and a projection lens. The at least two light valves are located on a transmission path of the illumination beam, and is configured to convert the illumination beam into an image beam. The projection lens is located on a transmission path of the image beam and is configured to project the image beam out of the projection apparatus.

Based on the above description, the embodiments of the disclosure have at least one of following advantages or effects. In the embodiments of the disclosure, the projection apparatus and the illumination system are capable of adjusting a proportion of the first portion and the second portion of the first laser beam through the configuration of the first light splitting region and the second light splitting region of the light splitting module, thereby adjusting a relative proportion of the blue light in the illumination beam. Therefore, the illumination system and the projection apparatus may adjust color temperatures of the illumination beam and the image beam without adjusting an intensity of the first laser light source or the second laser light source, so as to avoid losing brightness of a display image.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
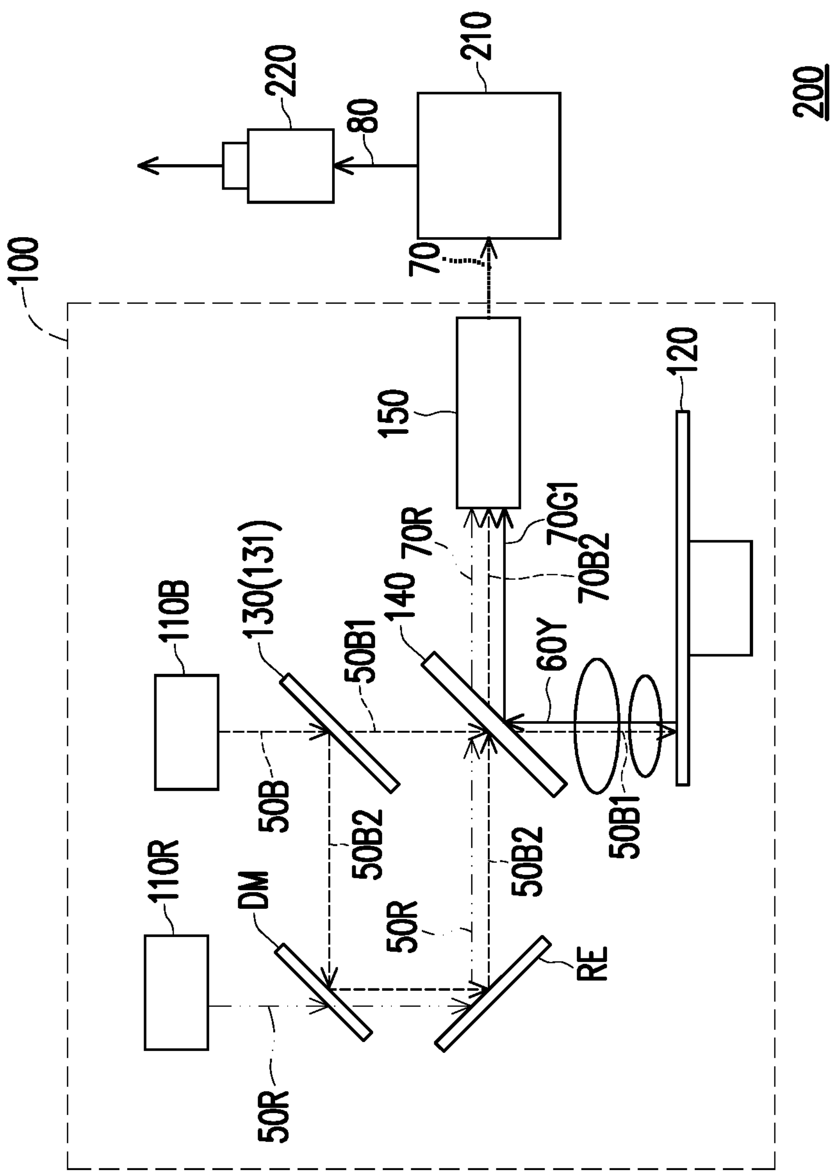
FIG. 1 is a structural schematic diagram of a projection apparatus according to an embodiment of the disclosure.
Figure 2A:
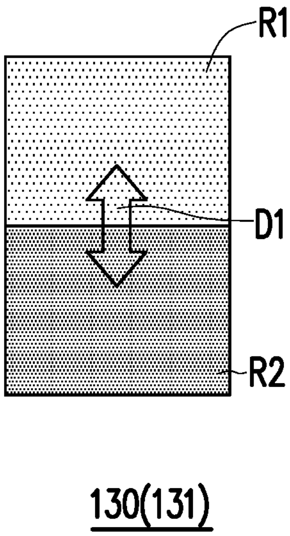
FIG. 2A is a top view of a light splitting module of FIG. 1.

FIG. 1 is a structural schematic diagram of a projection apparatus according to an embodiment of the disclosure. FIG. 2A is a top view of a light splitting module of FIG. 1. A projection apparatus 200 includes an illumination system 100, an imaging module 210 and a projection lens 220. The illumination system 100 is adapted to provide an illumination beam 70. The imaging module 210 is disposed on a transmission path of the illumination beam 70 and includes at least two light valves for converting the illumination beam 70 into an image beam 80. The projection lens 220 is disposed on a transmission path of the image beam 80, and is configured to project the image beam 80 out of the projection apparatus 200. In the embodiment, the imaging module 210 includes three light valves, but the disclosure is not limited thereto, and in other embodiments, a number of the light valves of the imaging module 210 may also be two. Moreover, in the embodiment, the light valves of the imaging module 210 may be digital micro-mirror devices (DMD) or liquid-crystal-on-silicon panels (LCOS panels). However, in other embodiments, the light valves may also be transmissive liquid crystal panels or other light beam modulators.

To be specific, as shown in FIG. 1, in the embodiment, the illumination system 100 is configured to provide the illumination beam 70, and includes a first laser light source 110B, a second light source 110R, a wavelength conversion module 120, a light splitting module 130, a light combining element 140 and a light uniforming element 150. As shown in FIG. 1, in the embodiment, the first laser light source 110B provides a first laser beam 50B, and the second light source 110R provides a second light beam 50R. For example, in the embodiment, the first laser light source 110B is a blue laser light source, the first laser beam 50B is a blue laser beam, and the second light source 110R is a red light source, and the second light beam 50R is a red light beam. In the embodiment, the first laser light source 110B may be, for example, a plurality of blue laser diodes arranged in an array, and the second light source 110R may be, for example, a plurality of red laser diodes arranged in an array or a plurality of red light-emitting diodes (LEDs) arranged in an array, but the disclosure is not limited thereto.

On the other hand, as show in FIG. 1, in the embodiment, the light splitting module 130 is located on a transmission path of the first laser beam 50B. When the first laser beam 50B emitting from the first laser light source 110B is incident to the light splitting module 130, a first portion 50B1 of the first laser beam 50B penetrates through the light splitting module 130, and meanwhile a second portion 50B2 of the first laser beam 50B is reflected by the light splitting module 130. In this way, the first portion 50B1 and the second portion 50B2 of the first laser beam 50B may be transmitted to subsequent different optical elements by the light splitting module 130.

To be specific, as shown in FIG. 1 and FIG. 2A, the light splitting module 130 includes a light splitting element 131 and has a first light splitting region R1 and a second light splitting region R2. In the embodiment, the first light splitting region R1 and the second light splitting region R2 are disposed on the light splitting element 131, and the light splitting element 131 is disposed obliquely (for example, at an included angle of 45 degrees) relative to a transmission direction of the first laser beam 50B. Further, as shown in FIG. 2A, in the embodiment, the light splitting module 130 includes a driving device (not shown), and the driving device is connected to the light splitting element 131 to drive the light splitting element 131 to move, and the first light splitting region R1 and the second light splitting region R2 of the light splitting module 130 may be switchably cut into the transmission path of the first laser beam 50B. For example, as shown in FIG. 2A, in the embodiment, since the first light splitting region R1 and the second light splitting region R2 are arranged along a first straight line direction D1, a method of controlling the movement of the light splitting element 131 may be to control the light splitting element 131 to move back and forth along the first straight line direction D1 (for example, an up-down direction in FIG. 2A), so that when the light splitting element 131 of the light splitting module 130 is moved back and forth, the first light splitting region R1 and the second light splitting region R2 of the light splitting module 130 may be respectively cut into the transmission path of the first laser beam 50B, and the illumination system 100 is correspondingly switched to a first illumination mode and a second illumination mode. The first straight line direction D1, for example, has an included angle of 45 degrees with the transmission direction of the first laser beam 50B, but the disclosure is not limited thereto, and any moving direction that causes the first light splitting region R1 and the second light splitting region R2 to be respectively cut into the transmission path of the first laser beam 50B is considered to be within the scope of the disclosure.

To be specific, as shown in FIG. 2A, in the embodiment, the first light splitting region R1 and the second light splitting region R2 respectively have different proportions of transmittance and reflectance to the first laser beam 50B. In this way, in the first illumination mode, i.e., when the first light splitting region R1 of the light splitting element 131 of the light splitting module 130 is cut into the transmission path of the first laser beam 50B, the first laser beam 50B is incident to the first light splitting region R1 to form a first proportion of the first portion 50B1 to the second portion 50B2. In the second illumination mode, i.e., when the second light splitting region R2 of the light splitting element 131 of the light splitting module 130 is cut into the transmission path of the first laser beam 50B, the first laser beam 50B is incident to the second light splitting region R2 to form a second proportion of the first portion 50B1 to the second portion 50B2. Moreover, the first proportion and the second proportion may also be different according to a difference between light splitting proportions of the first light splitting region R1 and the second light splitting region R2.

For example, in the embodiment, the transmittance and reflectance of the first light splitting region R1 to the first laser beam 50B may be respectively 80% and 20%, namely, when the first light splitting region R1 of the light splitting module 130 is moved to the transmission path of the first laser beam 50B, 80% of the first laser beam 50B penetrates through the first light splitting region R1 to form the first portion 50B1 of the first laser beam 50B, and 20% of the first laser beam 50B is reflected by the first light splitting region R1 to form the second portion 50B2 of the first laser beam 50B. Therefore, in the first illumination mode, the first proportion between the first portion 50B1 and the second portion 50B2 of the first laser beam 50B is about 4:1. On the other hand, in the embodiment, the transmittance and reflectance of the second light splitting region R2 to the first laser beam 50B may be respectively 60% and 40%, namely, when the second light splitting region R2 of the light splitting module 130 is cut into the transmission path of the first laser beam 50B, t60% of the first laser beam 50B penetrates through the second light splitting region R2 to form the first portion 50B1 of the first laser beam 50B, and 40% of the first laser beam 50B is reflected by the second light splitting region R2 to form the second portion 50B2 of the first laser beam 50B. Therefore, in the second illumination mode, the second proportion between the first portion 50B1 and the second portion 50B2 of the first laser beam 50B is about 3:2.

Then, as shown in FIG. 1, in the embodiment, the light combining element 140 is located on transmission paths of the first laser beam 50B and the second light beam 50R, and is located between the light splitting module 130 and the wavelength conversion module 120. In the embodiment, the light combining element 140 is, for example, a dichroic mirror with green reflection, which is pervious to blue light and red light, and reflects green light. Moreover, the illumination system 100 further includes a dichroic mirror DM and a reflective element RE, where the dichroic mirror DM and the reflective element RE are located on the transmission paths of the first laser beam 50B and the second light beam 50R, and are located between the light splitting module 130 and the light combining element 140, and located between the second light source 110R and the light combining element 140. For example, in the embodiment, the dichroic mirror DM is, for example, a dichroic mirror with blue reflection, which reflects blue light, and is pervious to light of other colors (for example, red light), and the reflective element RE provides the reflection function to blue light and red light.

Therefore, as shown in FIG. 1, in the embodiment, when the first portion 50B1 and the second portion 50B2 of the first laser beam 50B are transmitted to subsequent different optical elements through the light splitting module 130, since the first portion 50B1 of the first laser beam 50B may penetrate through the light splitting element 131, it is transmitted to the light combining element 140. Moreover, since the light combining element 140 may be pervious to the first laser beam 50B of a blue color, the first portion 50B1 of the first laser beam 50B may penetrate through the light combining element 140 and is transmitted to the wavelength conversion module 120. Further, as shown in FIG. 1, in the embodiment, the wavelength conversion module 120 is located on the transmission path of the first portion 50B1 of the first laser beam 50B. Moreover, in the embodiment, the wavelength conversion module 120 is a wavelength conversion wheel and has a wavelength conversion material disposed on a circular substrate, and the wavelength conversion material is formed into an O-ring shape on the circular substrate. For example, the wavelength conversion material includes phosphor powder, and is adapted to convert the first portion 50B1 of the first laser beam 50B into a wavelength converted light beam. In the embodiment, the wavelength conversion material is, for example, phosphor powder adapted to be excited to emit a yellow light beam, and when the first portion 50B1 of the first laser beam 50B of the blue color is incident to the wavelength conversion material, the first portion 50B1 of the first laser beam 50B is converted into a yellow light beam, but the disclosure is not limited thereto. In other embodiments, the wavelength conversion material is, for example, phosphor powder adapted to be excited to emit a yellow-green light beam or a green light beam. In addition, since a region where the wavelength conversion material is located has the O-ring shape, the rotation of the wavelength conversion module 120 is unnecessary to be synchronized with a switching time of the first laser light source 110B and the second light source 110R or a switching time of a state of the imaging module 210. In this way, when the first portion 50B1 of the first laser beam 50B is transmitted to the wavelength conversion module 120, the wavelength conversion module 120 may convert the first portion 50B1 of the first laser beam 50B into a wavelength converted light beam 60Y of a yellow color through the wavelength conversion material, and then transmit the wavelength converted light beam 60Y to the light combining element 140. However, since the light combining element 140 only reflects green light, the wavelength converted light beam 60Y may form first color light 70G1 of a green color through the light combining element 140.

On the other hand, as shown in FIG. 1, the second portion 50B2 of the first laser beam 50B reflected by the light splitting element 131 may be sequentially transmitted to the dichroic mirror DM and the reflective element RE. In addition, the second portion 50B2 of the first laser beam 50B may be reflected by the dichroic mirror DM and the reflective element RE successively and is transmitted to the light combining element 140 to form second color light 70B2 of the blue color. Moreover, the second light beam 50R provided by the second light source 110R may penetrate through the dichroic mirror DM, and is reflected by the reflective element RE, and transmitted to the light combining element 140 to form third color light 70R of a red color.

In this way, as shown in FIG. 1, the first color light 70G1, the second color light 70B2 and the third color light 70R may form the illumination beam 70 through the light combining element 140. In the embodiment, the first color light 70G1 is green light, the second color light 70B2 is blue light, and the third color light 70R is red light. Moreover, as shown in FIG. 1, in the embodiment, the light uniforming element 150 is located on a transmission path of the illumination beam 70. In the embodiment, the light uniforming element 150 may be an integration rod, but the disclosure is not limited thereto. In more detail, as shown in FIG. 1, when the illumination beam 70 is transmitted to the light uniforming element 150, the light uniforming element 150 may uniformize the illumination beam 70 and transmit the same to the imaging module 210.

Then, as shown in FIG. 1, the imaging module 210 is located on the transmission path of the illumination beam 70, and is configured to convert the illumination beam 70 into the image beam 80. The projection lens 220 is located on a transmission path of the image beam 80, and is configured to project the image beam 80 out of the projection apparatus 200 to form an image. After the illumination beam 70 is converged on the imaging module 210, since the imaging module 210 may sequentially convert the illumination beam 70 into the image beam 80 of different colors and transmit the image beam 80 to the projection lens 220, the projected image formed by the image beam 80 converted by the imaging module 210 may be a color image.

Further, in the embodiment, since the illumination beam 70 is formed by mixing the first color light 70G1, the second color light 70B2 and the third color light 70R, a hue or color temperature of the illumination beam 70 may be determined by a proportional relationship of the first color light 70G1, the second color light 70B2 and the third color light 70R, and a hue or color temperature of the image beam 80 formed by the illumination beam 70 is also determined by the aforementioned proportional relationship.

To be specific, higher a proportion of the blue light to the illumination beam 70 is, the higher the color temperature of the illumination beam 70 is. Further, as described above, in the embodiment, in the first illumination mode (i.e., when the first laser beam 50B is incident to the first light splitting region R1 of the light splitting module 130), the first proportion between the first portion 50B1 and the second portion 50B2 of the first laser beam 50B is about 4:1, so that a proportion of the first color light 70G1 to the second color light 70B2 is also about 4:1, and in the second illumination mode (i.e., when the first laser beam 50B is incident to the second light splitting region R2 of the light splitting module 130), the second proportion between the first portion 50B1 and the second portion 50B2 of the first laser beam 50B is about 3:2, so that a proportion of the first color light 70G1 to the second color light 70B2 is also about 3:2. In other words, in the embodiment, since an intensity of the second portion 50B2 of the first laser beam 50B in the first illumination mode is less than an intensity of the second portion 50B2 of the first laser beam 50B in the second illumination mode, an intensity of the second color light 70B2 (blue light)

in the illumination beam 70 formed by the illumination system 100 in the first illumination mode is also less than an intensity of the second color light 70B2 (blue light) in the illumination beam 70 formed by the illumination system 100 in the second illumination mode. Therefore, in the embodiment, a color temperature of the illumination beam 70 in the first illumination mode is also less than the color temperature of the illumination beam 70 formed in the second illumination mode.

Therefore, in the embodiment, the projection apparatus 200 and the illumination system 100 may adjust a proportion of the first portion 50B1 and the second portion 50B2 of the first laser beam 50B through the configuration of the first light splitting region R1 and the second light splitting region R2 of the light splitting element 131 of the light splitting module 130, thereby adjusting a relative proportion of the first color light 70G1 and the second color light 70B2 of the illumination beam 70. Therefore, the illumination system 100 and the projection apparatus 200 may adjust a color temperature of the image beam 80 without adjusting the intensity of the first laser light source 110B or the second light source 110R, so as to avoid losing brightness of a display image.

It should be noted that in the embodiment, although the situation that the intensity of the second portion 50B2 of the first laser beam 50B in the first illumination mode is less than the intensity of the second portion 50B2 of the first laser beam 50B in the second illumination mode is taken as an example for description, the disclosure is not limited thereto. In other embodiments, the proportional relationship of the transmittance and reflectance of the first light splitting region R1 and the second light splitting region R2 of the light splitting module 130 to the first laser beam 50B may also be changed, so that the intensity of the second portion 50B2 of the first laser beam 50B in the first illumination mode is greater than the intensity of the second portion 50B2 of the first laser beam 50B in the second illumination mode, thereby making the color temperature of the illumination beam 70 in the first illumination mode to be greater than the color temperature of the illumination beam 70 formed in the second illumination mode. After referring to the disclosure, any person skilled in the art may appropriately adjust the proportional relationship of the transmittance and reflectance of the first light splitting region R1 and the second light splitting region R2 of the light splitting module 130 to the first laser beam 50B to realize a color design effect of the illumination system 100 and the projection apparatus under different display modes, which is still within the scope of the disclosure.

On the other hand, in the embodiment of FIG. 1, although the method of controlling the movement of the light splitting element 131 is exemplified by controlling the light splitting element 131 to move back and forth along the first straight line direction D1, the disclosure is not limited thereto. In other embodiments, the method of controlling the movement of the light splitting element 131 may be correspondingly adjusted according to a type of the light splitting module 130, and after referring to the disclosure, any person skilled in the art may appropriately change the control method to achieve similar effects and advantages as that of the aforementioned projection apparatus 200, which is still within the scope of the disclosure. Other embodiments are provided for further description.

Figure 2B:
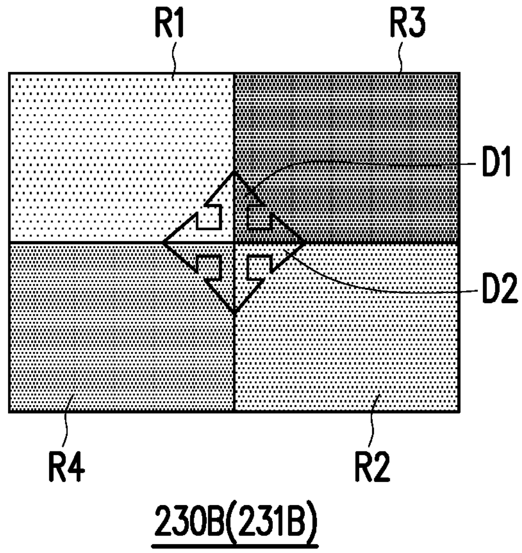
FIG. 2B to FIG. 2E are top views of different light splitting modules of FIG. 1.

FIG. 2B to FIG. 2E are top views of different light splitting modules of FIG. 1. Referring to FIG. 2B to FIG. 2E, a light splitting module 230B, a light splitting module 230C, a light splitting module 230D, and a light splitting module 230E of the embodiments of FIG. 2B to FIG. 2E are similar to the light splitting module 130 of FIG. 2A, and differences there between are as follows. Referring to FIG. 2B, in the embodiment of FIG. 2B, a number of the light splitting regions of the light splitting module 230B is not limited to two, and the light splitting regions are not limited to be arranged in a same direction. For example, as shown in FIG. 2B, in the embodiment of FIG. 2B, the number of the light splitting regions of the light splitting module 230B is four, where the first light splitting region R1 and a fourth light splitting region R4 are arranged along the first straight line direction D1; the second light splitting region R2 and a third light splitting region R3 are arranged along the first straight line direction D1; the first light splitting region R1 and the third light splitting region R3 are arranged along a second straight line direction D2; the second light splitting region R2 and the fourth light splitting region R4 are arranged along the second straight line direction D2, and the first straight line direction D1 is different from the second straight line direction D2. In this way, a light splitting element 231B of the light splitting module 230B may also be moved back and forth along the first straight line direction D1 (shown as an up-down direction in FIG. 2B) or the second straight line direction D2 (shown as a left-right direction in FIG. 2B), and one of the first light splitting region R1, the second light splitting region R2, the third light splitting region R3, and the fourth light splitting region R4 may be cut into the transmission path of the first laser beam 50B as required. The first light splitting region R1, the second light splitting region R2, the third light splitting region R3 and the fourth light splitting region R4 respectively have different proportions of transmittance and reflectance to the first laser beam 50B. In this way, when the light splitting module 230B is applied to the aforementioned illumination system 100 and the projection apparatus 200, the number of illumination modes that may be implemented is also increased.

Figure 2C:
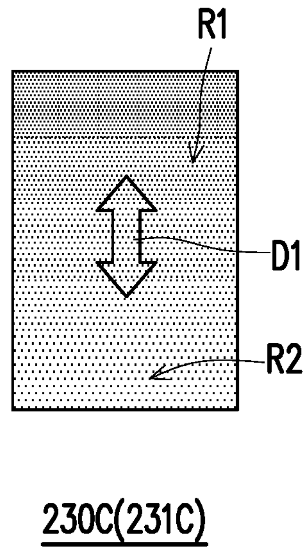

On the other hand, referring to FIG. 2C, in the embodiment of FIG. 2C, a boundary between the light splitting regions of the light splitting module 230C is not obvious. To be specific, as shown in FIG. 2C, in the embodiment of FIG. 2C, a proportional relationship of transmittance and reflectance of the first light splitting region R1 and the second light splitting region R2 of the light splitting module 230C to the first laser beam 50B is gradually varied. In other words, different positions of the light splitting element 231C of the light splitting module 230C in the first straight line direction D1 have different proportional relationships of transmittance and reflectance. Therefore, in the embodiment of FIG. 2C, the first laser beam 50B is incident on the different positons of the light splitting elements 231C during a process of gradually moving the from the first light splitting region R1 of the light splitting element 231C to the second light splitting region R2, such that an intensity of the second portion 50B2 of the first laser beam 50B may be gradually decreased or increased. Accordingly, when the light splitting module 230C is applied to the aforementioned illumination system 100 and the projection apparatus 200, the color temperatures of the illumination beam 70 formed by the illumination system 100 and the image beam 80 projected by the projection apparatus 200 may also be adjusted gradually.

Figure 2D:
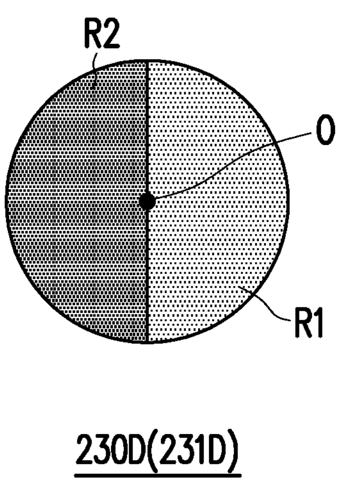
Figure 2E:
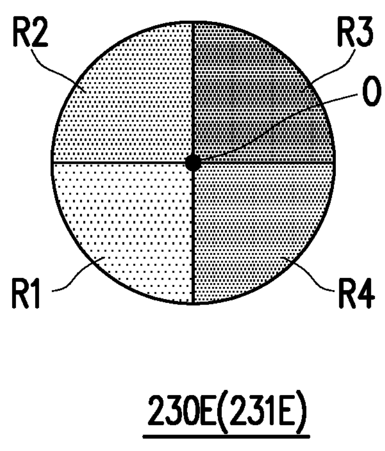

Moreover, referring to FIG. 2D and FIG. 2E, in the embodiment of FIG. 2D and FIG. 2E, a shape of the light splitting element 231D of the light splitting module 230D and a shape of the light splitting element 231E of the light splitting module 230E are not limited to rectangles, but may be circular or other similar polygonal shapes. Further, in the embodiment of FIG. 2D and FIG. 2E, the light splitting element 231D and the light splitting element 231E are rotated around central axes, and the first light splitting region R1, the second light splitting region R2 or more light splitting regions (the third light splitting region R3 and the fourth light splitting region R4 shown in FIG. 2E) may be arranged in a circumferential direction where the central axis is taken as a center. In this way, when the light splitting element 231D and the light splitting element 231E are rotated, one of the aforementioned light splitting regions may be cut into the transmission path of the first laser beam 50B as required. Therefore, when the light splitting module 230D or the light splitting module 230E is applied to the aforementioned illumination system 100 and the projection apparatus 200, similar effects and advantages as that of the aforementioned illumination system 100 and the projection apparatus 200 may also be achieved, and when the number of the light splitting regions of the light splitting module 230D or the light splitting module 230E is increased, the number of illumination modes that may be implemented by the illumination system 100 and the projection apparatus 200 is also increased.

Namely, in the embodiment of FIG. 2B to FIG. 2E, those skilled in the art may adjust the numbers and arrangement directions of the light splitting regions of the light splitting module 230B, the light splitting module 230C, the light splitting module 230D, and the light splitting module 230E according to actual requirements, such that when the light splitting module 230B, the light splitting module 230C, the light splitting module 230D, or the light splitting module 230E is applied to the aforementioned illumination system 100 and the projection apparatus 200, the color design effect of the aforementioned illumination system 100 and the projection device 200 under different display modes may be achieved, and the effects and advantages similar to that of the aforementioned illumination system 100 and the projection device 200 may also be achieved, and details thereof are not repeated.

Figure 3:
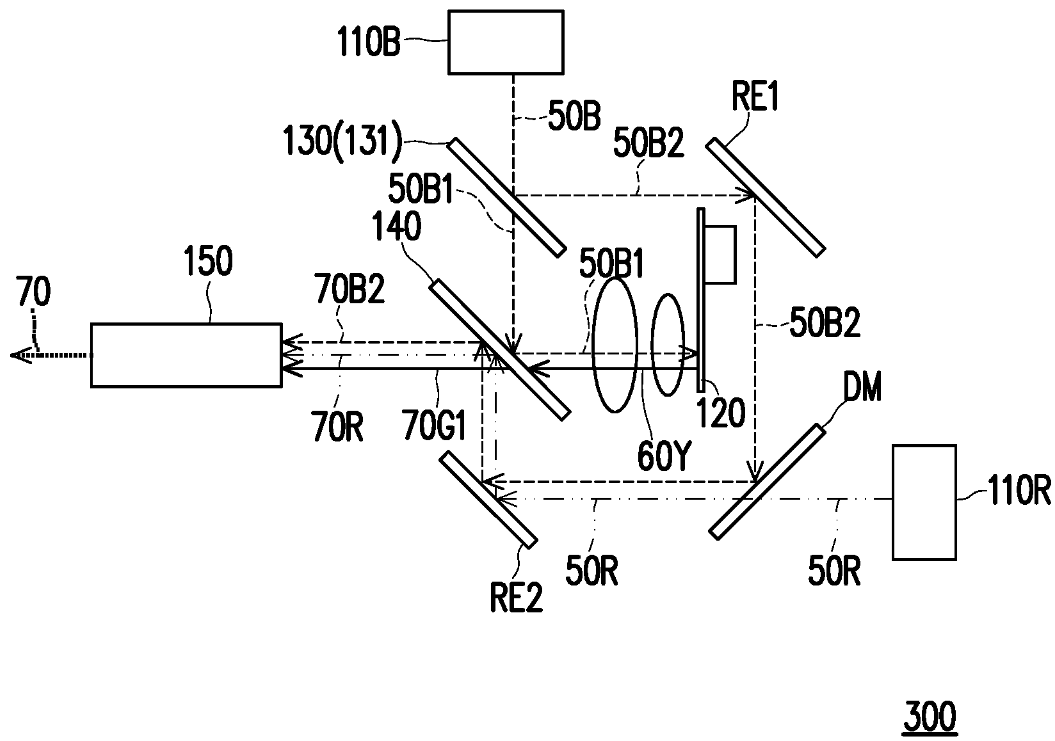
FIG. 3 is a structural schematic diagram of another illumination system according to an embodiment of the disclosure.

FIG. 3 is a structural schematic diagram of an illumination system according to an embodiment of the disclosure. Referring to FIG. 3, the illumination system 300 of the embodiment of FIG. 3 is similar to the illumination system 100 of FIG. 1, and a difference there between is as follows. As shown in FIG. 3, in the embodiment, the number of the reflective elements of the illumination system 300 is plural, which are respectively a reflective element RE1 and a reflective element RE2. As shown in FIG. 3, the dichroic mirror DM, the reflective element RE1, and the reflective element RE2 are also located on the transmission paths of the second portion 50B2 of the first laser beam 50B and the second light beam 50R, and are located between the light splitting module 130 and the light combining element 140, such that the second portion 50B2 of the first laser beam 50B and the second light beam 50R are respectively transmitted to the light combining element 140. In this way, as shown in FIG. 3, the first color light 70G1 converted from the first portion 50B1 of the first laser beam 50B, the second color light 70B2 formed by the second portion 50B2 of the first laser beam 50B and the third color light 70R formed by the second light beam 50R may form the illumination beam 70 after passing through the light combining element 140.

In this way, in the embodiment, the illumination system 300 may also have the advantages mentioned in the embodiment of the aforementioned illumination system 100 through configuration of the light splitting element 131 of the light splitting module 130, and when the illumination system 300 is applied to the projection apparatus 200, the projection apparatus 200 may also achieve the aforementioned effects and advantages, which are not repeated.

Figure 4A:
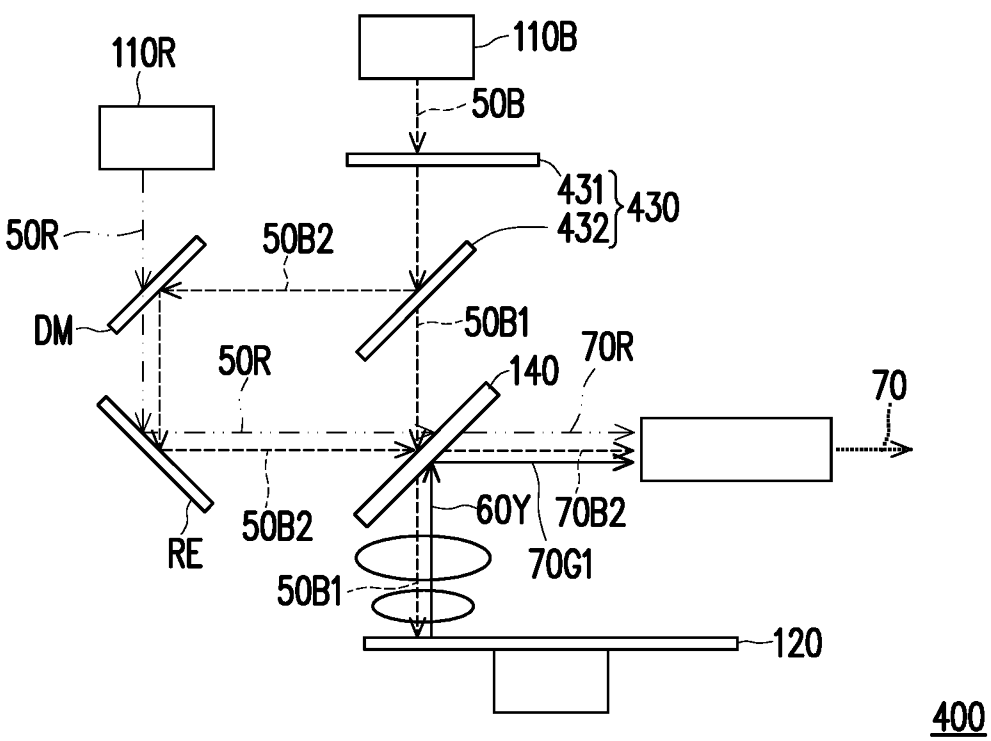
FIG. 4A is a structural schematic diagram of another illumination system according to an embodiment of the disclosure.
Figure 4B:
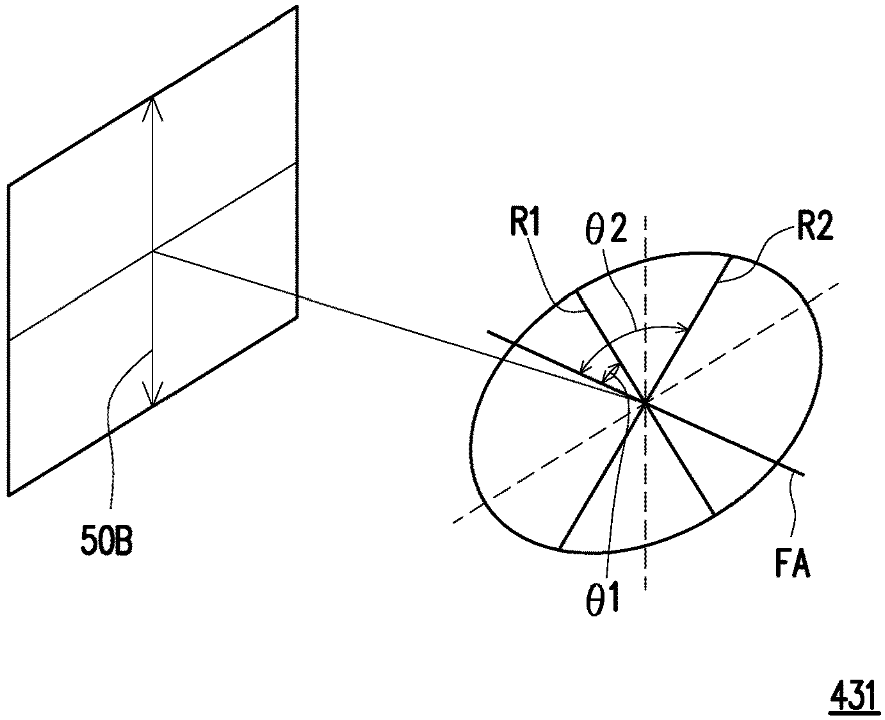
FIG. 4B is a schematic front view of a polarization light splitting element of FIG. 4A.

FIG. 4A is a structural schematic diagram of an illumination system according to an embodiment of the disclosure. FIG. 4B is a schematic front view of a polarization light splitting element of FIG. 4A. Referring to FIG. 4A and FIG. 4B, an illumination system 400 of the embodiment is similar to the illumination system 100 of FIG. 1, and differences there between are as follows. As shown in FIG. 4A and FIG. 4B, in the embodiment, a light splitting module 430 of the illumination system 400 includes a phase delay element 431 and a polarization light splitting element 432, the first light splitting region R1 and the second light splitting region R2 are located on the phase delay element 431, and the phase delay element 431 is adapted to be rotated, so that the first light splitting region R1 and the second light splitting region R2 may be switchably cut into the transmission path of the first laser beam 50B.

To be specific, as shown in FIG. 4B, in the embodiment, the first light splitting region R1 is located at a position of the phase delay element 431 where a fast axis FA has a first included angle θ1. Thus, when the first light splitting region R1 is cut into the transmission path of the first laser beam 50B, after the first laser beam 50B passes through the phase delay element 431, a phase of the first laser beam 50B is rotated by twice of the first included angle θ1. Namely, if the first laser beam 50B originally only has a first polarization state, after the first laser beam 50B passes through the phase delay element 431, the first laser beam 50B may be converted into the first portion 50B1 having the first polarization state and the second portion 50B2 having a second polarization state, where the first polarization state is orthogonal to the second polarization state. In this way, when the first laser beam 50B is transmitted to the polarization light splitting element 432, since the polarization state of the first portion 50B1 of the first laser beam 50B is orthogonal to the polarization state of the second portion 50B2 of the first laser beam 50B, the polarization light splitting element 432 may accordingly provide different effects on the first portion 50B1 and the second portion 50B2 of the first laser beam 50B, so as to split the first portion 50B1 of the first laser beam 50B from the second portion 50B2 of the first laser beam 50B. For example, in the embodiment, the polarization light splitting element 432 may be pervious to the first portion 50B1 of the first laser beam 50B and reflects the second portion 50B2 of the first laser beam 50B. Moreover, in the first illumination mode of the embodiment, i.e., when the first light splitting region R1 is cut into the transmission path of the first laser beam 50B, the first laser beam 50B is incident to the first light splitting region R1 to form a first proportion of the first portion 50B1 to the second portion 50B2, and the first proportion is determined by the first included angle θ1.

On the other hand, as shown in FIG. 4B, in the embodiment, the second light splitting region R2 is located at a position of the phase delay element 431 where the fast axis FA has a second included angle θ2. When the first illumination mode is switched to the second illumination mode, the phase delay element 431 may be rotated so that t the first light splitting region R1 of the light splitting element 431 is switched to the second light splitting region R2. In this way, when the second light splitting region R2 is cut into the transmission path of the first laser beam 50B, after the first laser beam 50B passes through the phase delay element 431, the phase of the first laser beam 50B may be rotated by twice the second included angle θ2. Therefore, the first laser beam 50B may also be converted into the first portion 50B1 having the first polarization state and the second portion 50B2 having the second polarization state, and is split after passing through the polarization light splitting element 432. Moreover, similarly, in the second illumination mode of the embodiment, i.e., when the second light splitting region R2 is cut into the transmission path of the first laser beam 50B, the first laser beam 50B is incident on the second light splitting region R2 to form a second proportion of the first portion 50B1 to the second portion 50B2, and the second proportion is determined by the second included angle θ2.

Further, in the embodiment, since the first light splitting region R1 and the second light splitting region R2 are located at different positions, the first included angle θ1 and the second included angle θ2 are different. Therefore, since the aforementioned first proportion and the second proportion are also varied along with the difference between the first included angle θ1 and the second included angle θ2, an intensity of the second portion 50B2 of the first laser beam 50B in the first illumination mode is also different to an intensity of the second portion 50B2 of the first laser beam 50B in the second illumination mode. In this way, an intensity of the second color light 70B2 (blue light) of the illumination beam 70 formed by the illumination system 400 in the first illumination mode is also different to an intensity of the second color light 70B2 (blue light) of the illumination beam 70 formed by the illumination system 400 in the second illumination mode.

Therefore, in the embodiment, the illumination system 400 may adjust a proportion of the first portion 50B1 and the second portion 50B2 of the first laser beam 50B through the light splitting module 430 by controlling the arrangement and movement of the first light splitting region R1 and the second light splitting region R2 of the light splitting element 431 of the light splitting module 430, so as to adjust a relative proportion of the first color light 70G1 and the second color light 70B2 of the illumination beam 70. Therefore, the illumination system 400 may adjust a color temperature of the illumination beam 70 without adjusting the intensity of the first laser light source 110B or the second light source 110R, so as to avoid the loss of brightness of the display image, and achieve the advantages mentioned in the aforementioned illumination system 100. Moreover, when the illumination system 400 is applied to the projection apparatus 200, the projection apparatus 200 may also achieve the aforementioned effects and advantages, which are not repeated.

Figure 5:
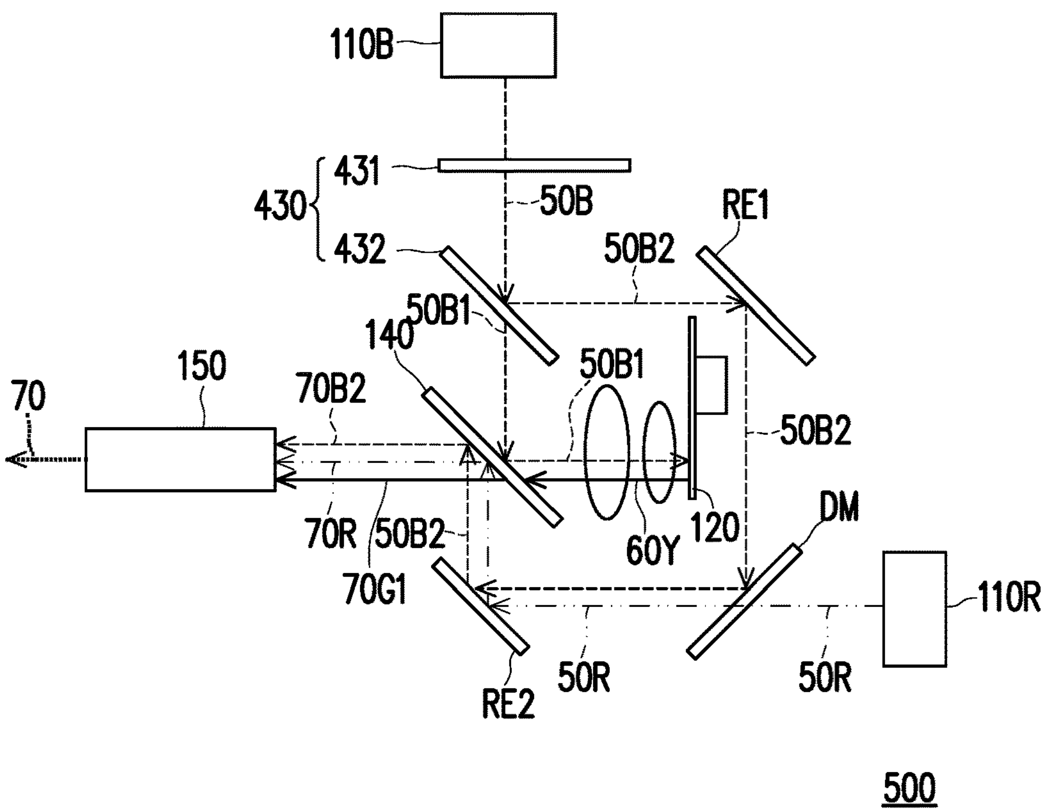
FIG. 5 to FIG. 13B are structural schematic diagrams of different illumination systems according to an embodiment of the disclosure.

FIG. 5 is a structural schematic diagram of an illumination system according to an embodiment of the disclosure. Referring to FIG. 5, an illumination system 500 of the embodiment of FIG. 5 is similar to the illumination system 400 of FIG. 4A, and a difference there between is as follows. As shown in FIG. 5, in the embodiment, the number of the reflective elements of the illumination system 500 is plural, which are respectively the reflective element RE1 and the reflective element RE2. As shown in FIG. 5, the dichroic mirror DM, the reflective element RE1, and the reflective element RE2 are also located on the transmission paths of the second portion 50B2 of the first laser beam 50B and the second light beam 50R, and are located between the light splitting module 430 and the light combining element 140, such that the second portion 50B2 of the first laser beam 50B and the second light beam 50R are respectively guided to the light combining element 140. In this way, as shown in FIG. 5, the first color light 70G1 converted from the first portion 50B1 of the first laser beam 50B, the second color light 70B2 formed by the second portion 50B2 of the first laser beam 50B and the third color light 70R formed by the second light beam 50R may form the illumination beam 70 after passing through the light combining element 140.

In this way, in the embodiment, the illumination system 500 may also be provided with the phase delay element 431 and the polarization light splitting element 432 of the light splitting module 430, and thus the first laser beam 50B may be converted into the first portion 50B1 having the first polarization state and the second portion 50B2 having the second polarization state, and the first laser beam 50B is split after passing through the polarization light splitting element 432, such that the illumination system 500 may have the advantages mentioned in the embodiment of the aforementioned illumination system 400, and when the illumination system 500 is applied to the projection apparatus 200, the projection apparatus 200 may also achieve the aforementioned effects and advantages, which are not repeated.

Figure 6A:
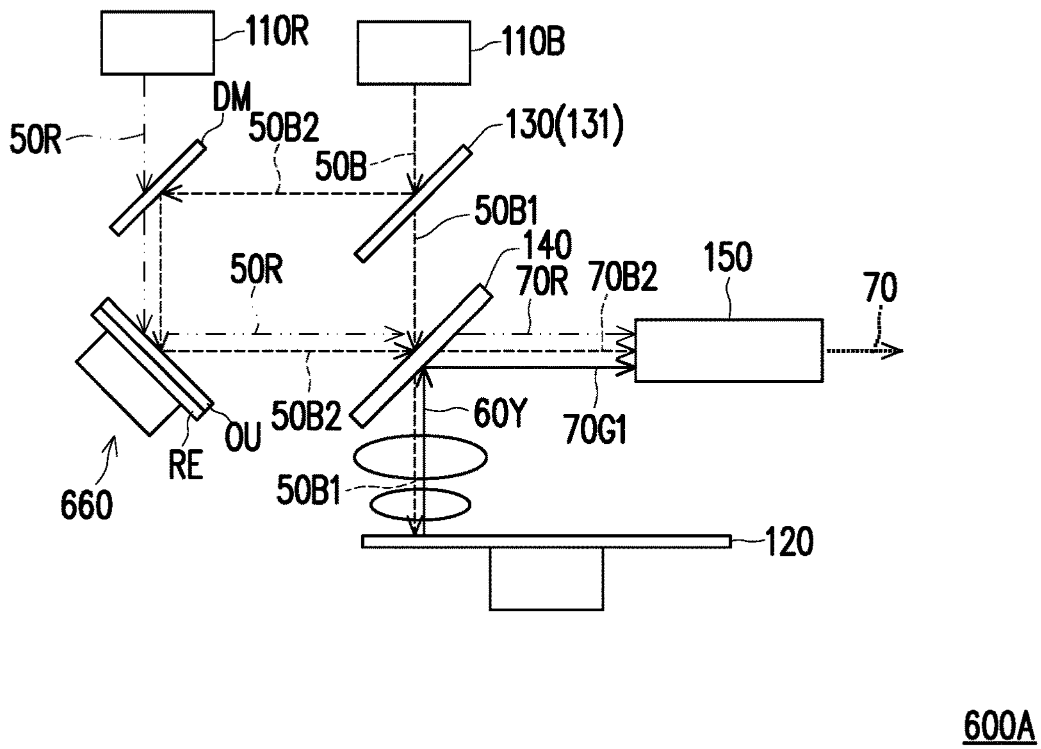
Figure 6B:
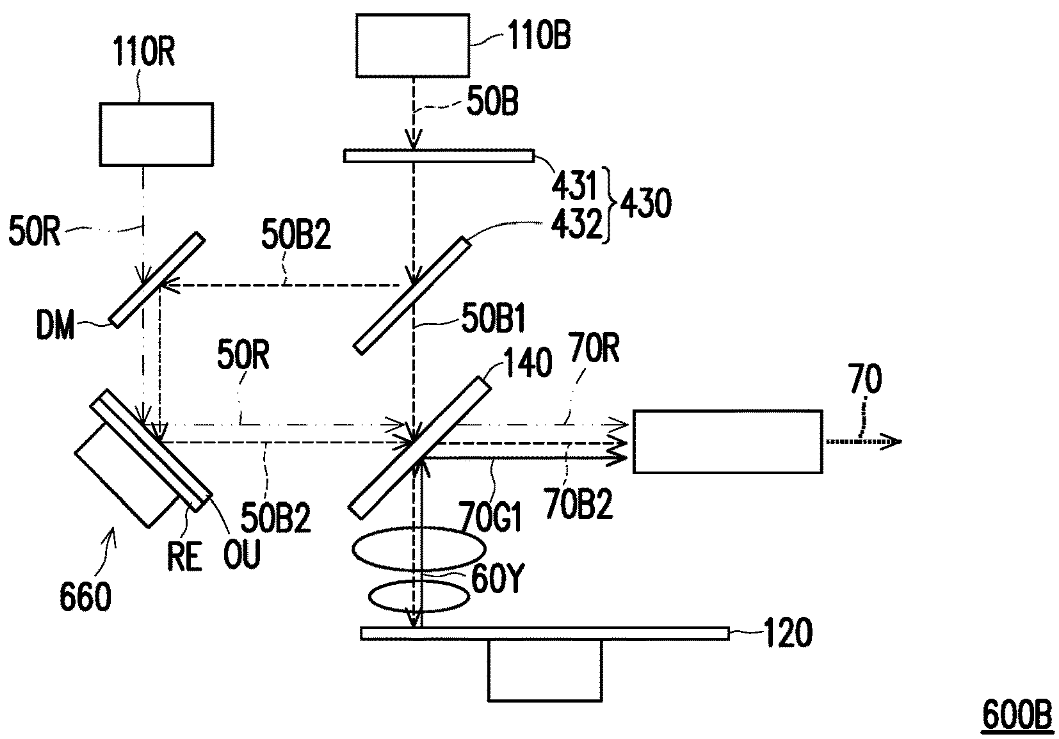

FIG. 6A is a structural schematic diagram of an illumination system according to an embodiment of the disclosure. FIG. 6B is a structural schematic diagram of an illumination system according to an embodiment of the disclosure. Referring to FIG. 6A and FIG. 6B, an illumination system 600A of FIG. 6A is similar to the illumination system 100 of FIG. 1, and an illumination system 600B of FIG. 6B is similar to the illumination system 400 of FIG. 4A, and differences there between are as follows. Referring to FIG. 6A and FIG. 6B, in the embodiments, the illumination system 600A and the illumination system 600B further respectively include an optical uniforming unit OU, and the second light source 110R may, for example, include a red laser diode, and the second light beam 50R is a red laser beam. The optical uniforming unit OU is disposed on the reflective element RE and is located on the transmission paths of the first laser beam 50B and the second laser beam 50R to form a reflective optical module 660 used for rotating. For example, the optical uniforming unit OU may include a light diffusing element, a polarizing element, or a combination of the light diffusing element and the polarizing element.

Further, when the optical uniforming unit OU includes the light diffusing element, the first laser beam 50B and the second light beam 50R are incident on the rotated optical uniforming unit OU to be diffused, so as to eliminate a speckle of laser light. When the optical uniforming unit OU includes the polarizing element, the first laser beam 50B and the second light beam 50R are incident on the rotated optical uniforming unit OU to have different polarization states at different time. In this way, the illumination system 600A and the illumination system 600B may be applied to the projection apparatus 200 configured with a polarized stereoscopic mode to eliminate a phenomenon of uneven image color or uneven image brightness often occurred in the projection apparatus 200 configured with the polarized stereoscopic mode.

For example, in a known illumination system framework, polarization of a laser beam may be destroyed by other internal optical components, so that the laser beam may have different polarization directions and the intensity become non-uniform, which causes a problem of uneven brightness of the display image projected from the projection apparatus configured with the polarized stereoscopic mode. However, in the illumination system 600A and the illumination system 600B of the embodiment, since the illumination beam 70 and the image beam 80 formed by the first laser beam 50B and the second light beam 50R may have different polarization states at different time, different lights spots may be formed along with different time points. Due to an effect of visual persistence, a brightness of a light spot on an illuminated surface observed by human eyes may be a superimposed brightness of light spots at different time points during a visual persistence time period, so that the light spots at different time points within the visual persistence time period may produce the superimposed light spot with relatively uniform brightness, and therefore the color or brightness of the display image viewed by the user may be uniform, and the user may view a stereoscopic display image with better uniformity. For example, in the embodiment, since the optical uniforming unit OU is provided on the reflective element RE, the polarizing element is preferably a quarter-wave plate, a depolarizer, a circular polarizer, or a combination of the quarter-wave plate and the circular polarizer.

Moreover, in the embodiment, the illumination system 600A and the illumination system 600B may also have the advantages mentioned in the embodiments of the aforementioned illumination system 100 and the illumination system 400 through the arrangement of the light splitting module 130 and the light splitting module 430, respectively, and when the illumination system 600A and the illumination system 600B are applied to the projection apparatus 200, the projection apparatus 200 may also achieve the aforementioned effects and advantages, which are not repeated.

Figure 7A:
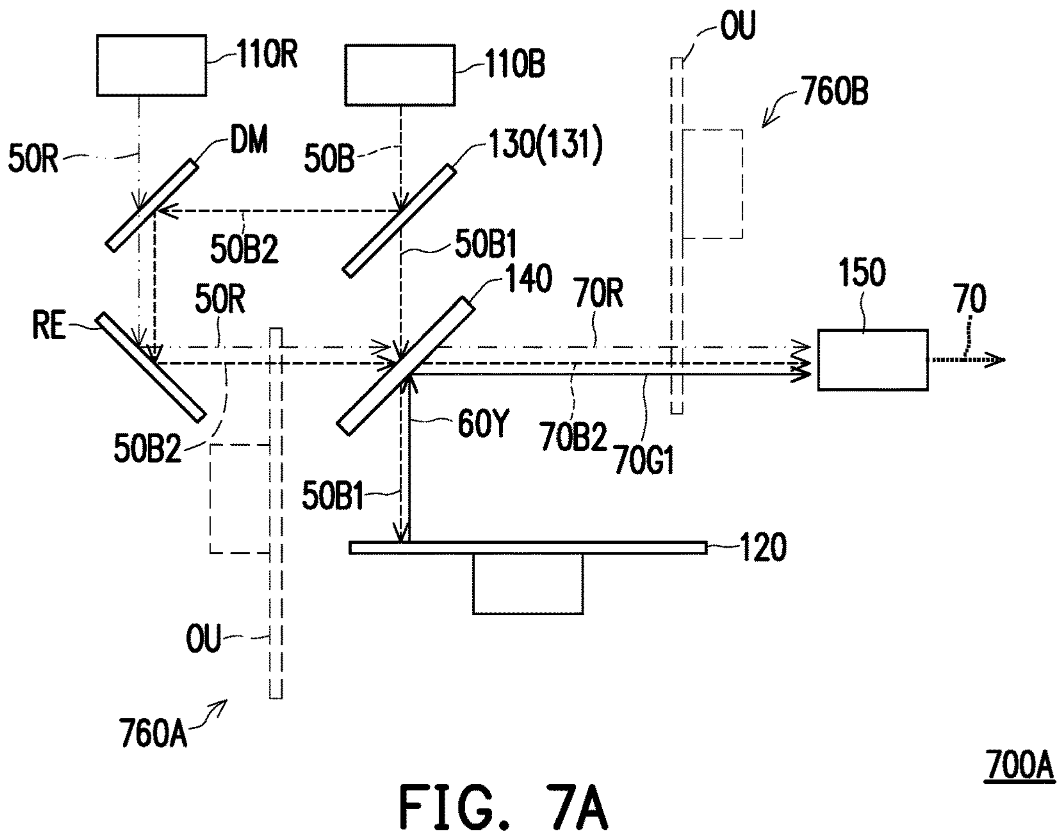
Figure 7B:
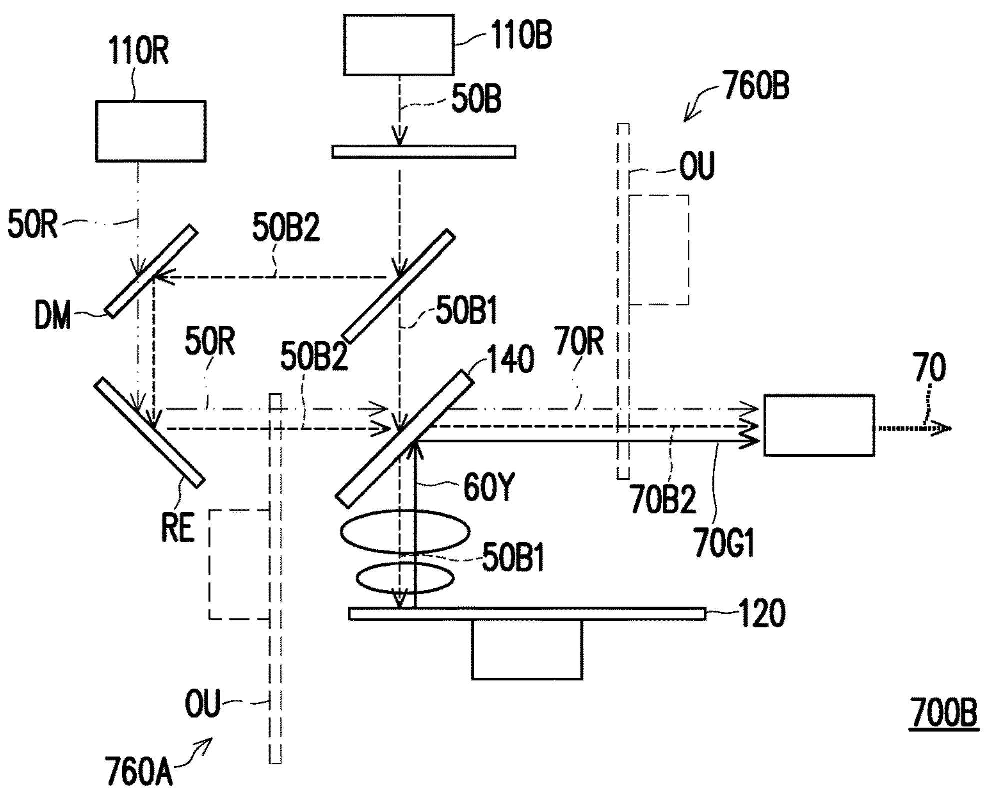

FIG. 7A is a structural schematic diagram of an illumination system according to an embodiment of the disclosure. FIG. 7B is a structural schematic diagram of an illumination system according to an embodiment of the disclosure. Referring to FIG. 7A and FIG. 7B, an illumination system 700A of FIG. 7A is similar to the illumination system 600A of FIG. 6A, and an illumination system 700B of FIG. 7B is similar to the illumination system 600B of FIG. 6B, and differences there between are as follows. Referring to FIG. 7A and FIG. 7B, in the embodiments, the optical uniforming unit OU is not disposed on the reflective element RE, but is disposed between the reflective element RE and the light combining element 140, or between the light combining element 140 and the light uniforming element 150. The optical uniforming unit OU and other driving elements form an independent optical module 760*a* or optical module 760*b* used for rotating along with other driving elements. In other words, in the embodiments of FIG. 6A and FIG. 6B, the optical module 660 is a reflective rotating optical module, but in the embodiments of FIG. 7A and FIG. 7B, the optical module 760A and the optical module 760B are respectively a transmissive rotating optical module, and the second light source 110R may, for example, include a red laser diode, and the second light beam 50R is a red laser beam. Moreover, in the embodiment, since the first laser beam 50B and the second light beam 50R may directly pass through the optical uniforming unit OU of the optical module 760A and the optical module 760B, when the optical uniforming unit OU includes a polarizing element to eliminate the phenomenon of uneven image color or uneven image brightness often occurred in the projection apparatus 200 configured with the polarized stereoscopic mode, the polarizing element may be a half-wave plate, a quarter-wave plate, a depolarizer, a circular polarizer, or a combination of the quarter-wave plate and the circular polarizer, which is preferably the half-wave plate.

In this way, in the embodiment, the illumination system 700A and the illumination system 700B may also have the advantages mentioned in the embodiments of the aforementioned illumination system 600A and the illumination system 600B through the arrangement of the optical uniforming unit OU, the light splitting module 130 and the light splitting module 430, and when the illumination system 700A and the illumination system 700B are applied to the projection apparatus 200, the projection apparatus 200 may also achieve the aforementioned effects and advantages, which are not repeated.

Figure 8:
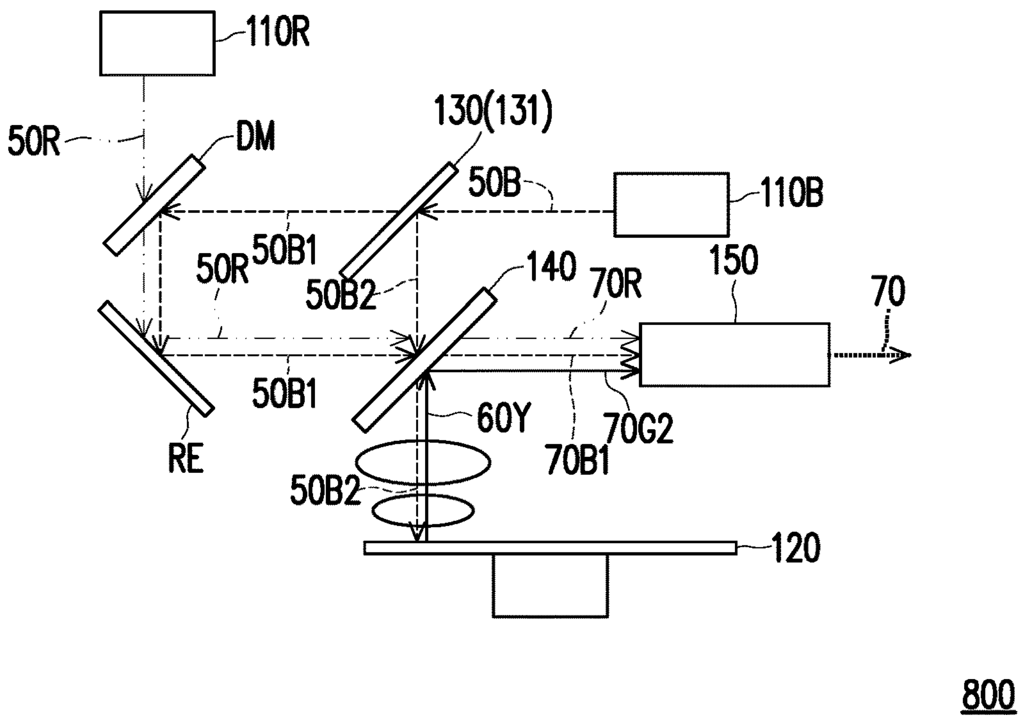
Figure 9:
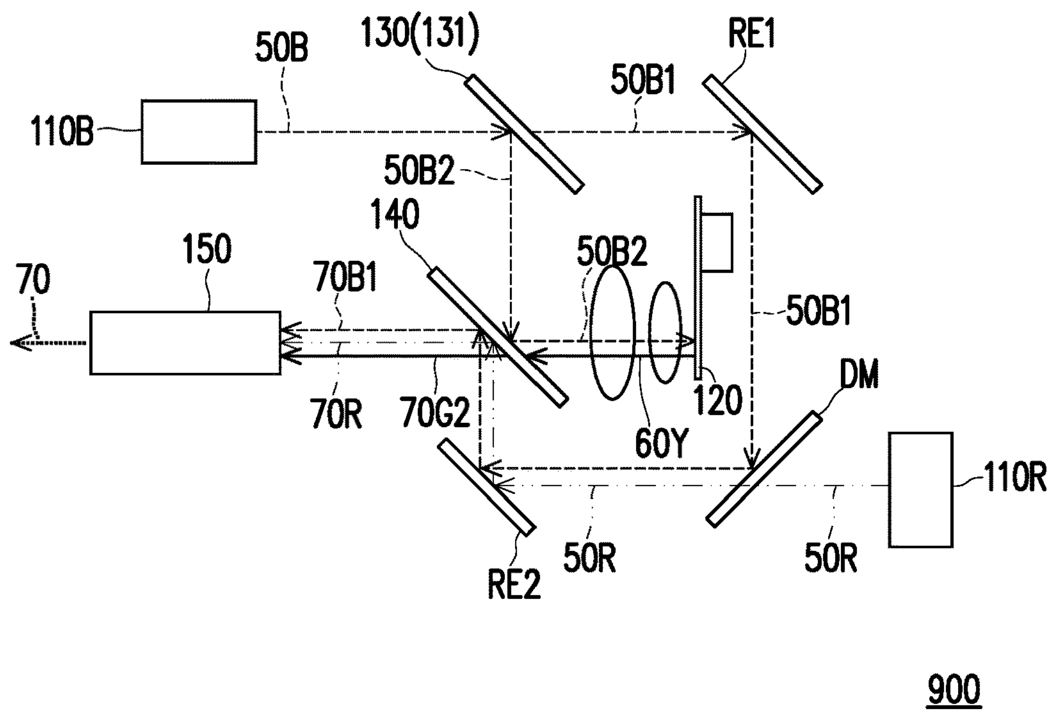
Figure 10:
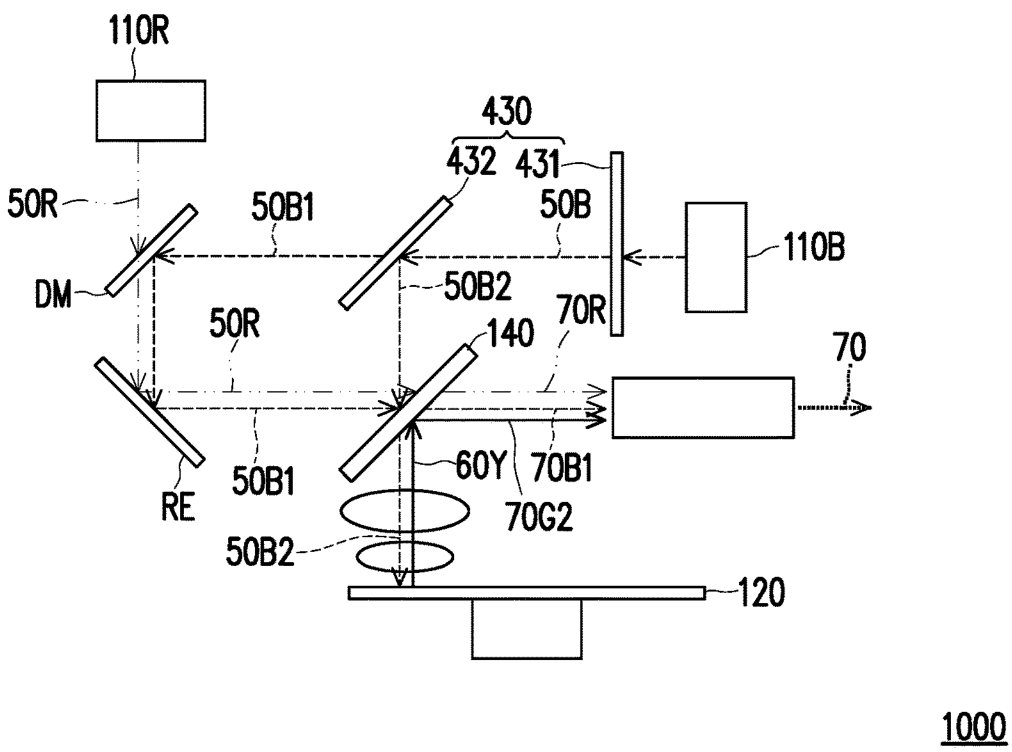
Figure 11:
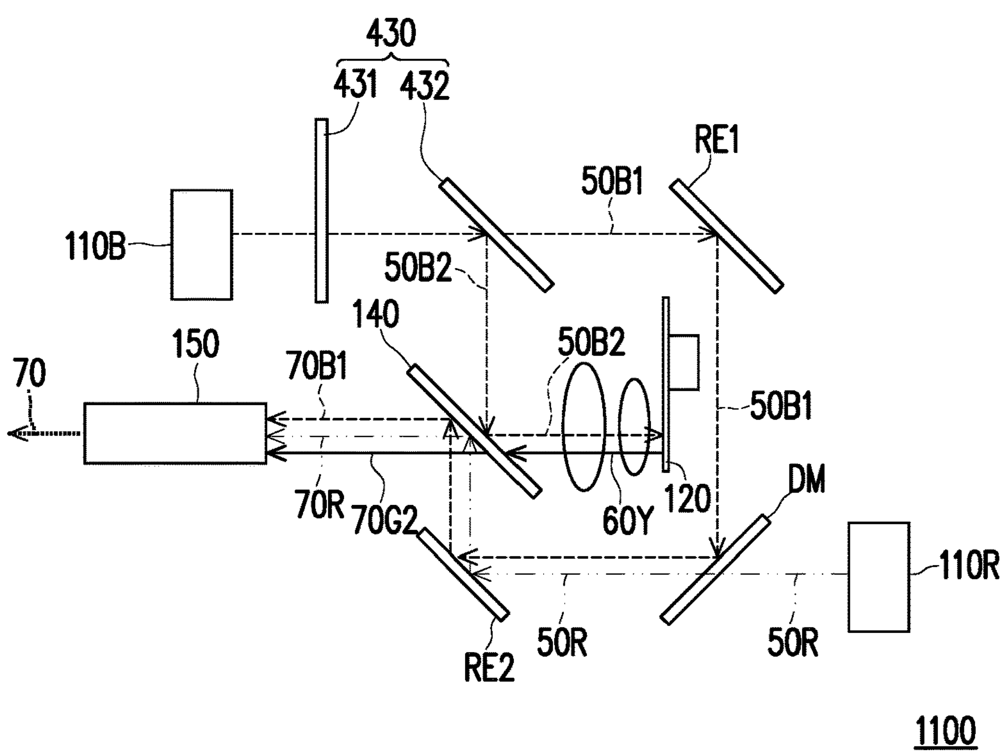
Figure 12A:
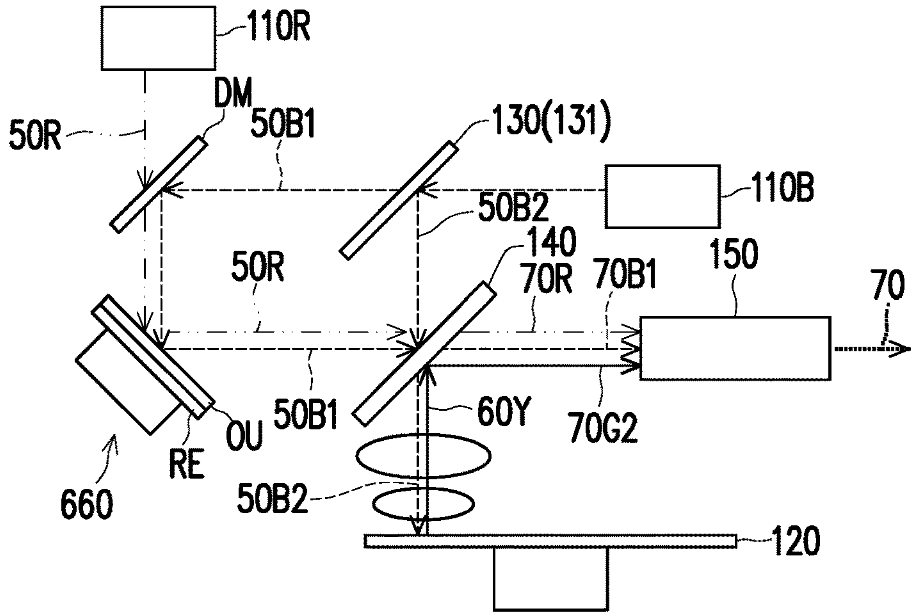
Figure 12B:
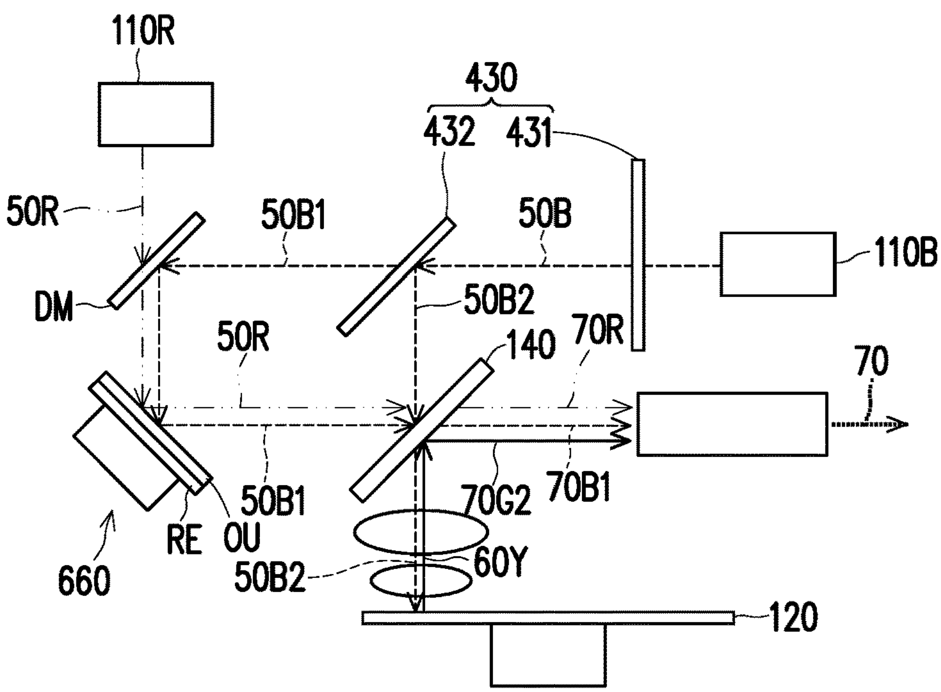
Figure 13A:
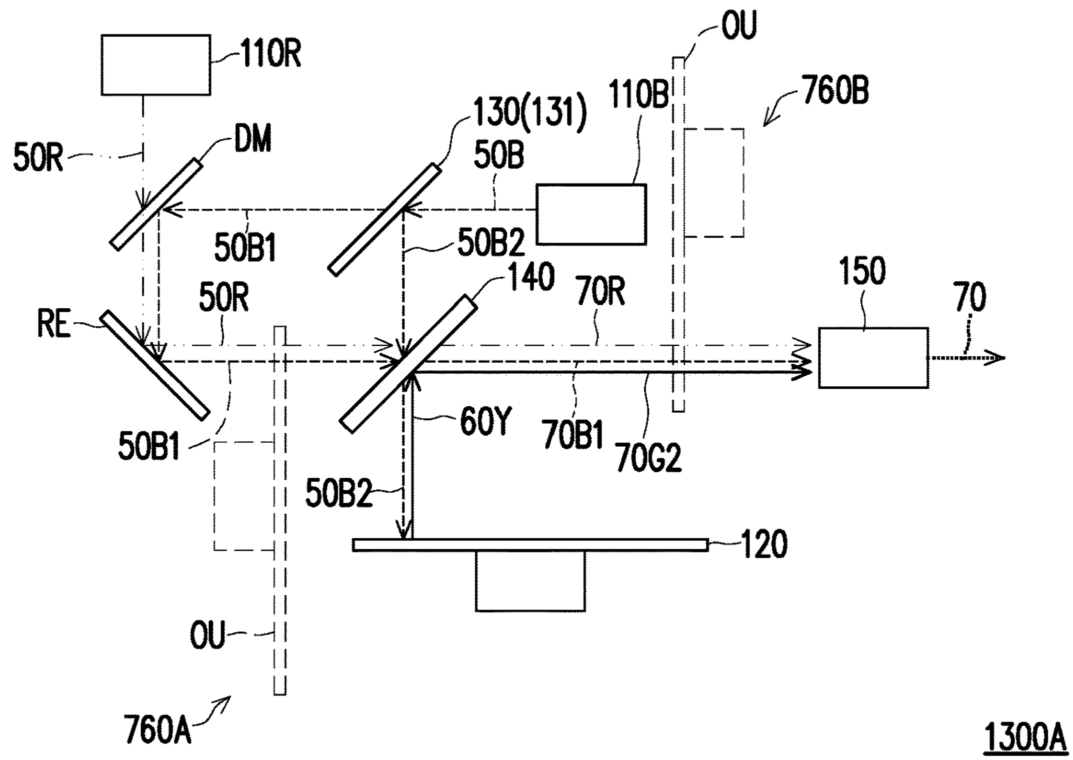
Figure 13B:
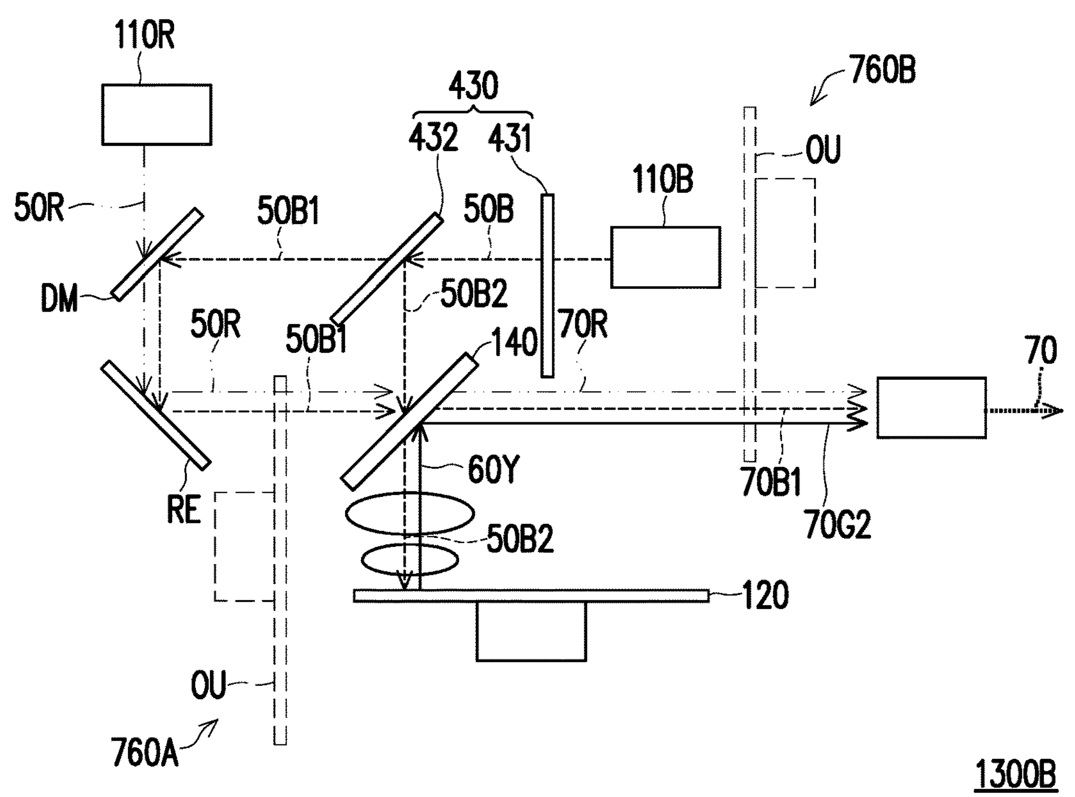

FIG. 8 to FIG. 13B are structural schematic diagrams of different illumination systems according to an embodiment of the disclosure. Referring to FIG. 8 to FIG. 13B, an illumination system 800 of FIG. 8 is similar to the illumination system 100 of FIG. 1, an illumination system 900 of FIG. 9 is similar to the illumination system 300 of FIG. 3, an illumination system 1000 of FIG. 10 is similar to the illumination system 400 of FIG. 4A, an illumination system 1100 of FIG. 11 is similar to the illumination system 500 of FIG. 5, an illumination system 1200A of FIG. 12A is similar to the illumination system 600A of FIG. 6A, an illumination system 1200B of FIG. 12B is similar to the illumination system 600B of FIG. 6B, an illumination system 1300A of FIG. 13A is similar to the illumination system 700A of FIG. 7A, an illumination system 1300B of FIG. 13B is similar to the illumination system 700B of FIG. 7B and differences there between are as follows.

Referring to FIG. 8 to FIG. 13B, in the embodiments of FIG. 8 to FIG. 13B, the first portion 50B1 of the first laser beam 50B is sequentially transmitted to the dichroic mirror DM and the reflective element RE (or the reflective element RE1, and the reflective element RE2) after penetrating through the light splitting element 131. In addition, the first portion 50B1 of the first laser beam 50B may be successively reflected by the dichroic mirror DM and the reflective element RE and transmitted to the light combining element 140 to form first color light 70B1. On the other hand, the second portion 50B2 of the first laser beam 50B is reflected by the light splitting element 131 and is transmitted to the wavelength conversion module 120 to form second color light 70G2. In other words, in the embodiments of FIG. 8 to FIG. 13B, the first color light 70B1 is blue light, and the second color light 70G2 is green light.

Namely, in the embodiments of FIG. 8 to FIG. 13B, a proportion of the blue light of the illumination beam 70 is determined by the first color light 70B1 formed by the first portion 50B1 of the first laser beam 50B, and in the embodiments of FIG. 8 to FIG. 13B, an intensity of the first portion 50B1 of the first laser beam 50B in the first illumination mode may be greater than or less than an intensity of the first portion 50B1 of the first laser beam 50B in the second illumination mode. Namely, the intensity of the first portion 50B1 of the first laser beam 50B in the first illumination mode is different to the intensity of the first portion 50B1 of the first laser beam 50B in the second illumination mode. Therefore, the intensity of the first color light 70B1 (blue light) in the illumination beam 70 formed by the illumination system 800, the illumination system 900, the illumination system 1000, the illumination system 1100, the illumination system 1200A, the illumination system 1200B, the illumination system 1300A, and the illumination system 1300B of FIG. 8 to FIG. 13B in the first illumination mode is also different to the intensity of the first color light 70B1 (blue light) in the illumination beam 70 formed in the second illumination mode, and the color temperatures thereof are also different.

For example, when the intensity of the first portion 50B1 of the first laser beam 50B in the first illumination mode is greater than the intensity of the first portion 50B1 of the first laser beam 50B in the second illumination mode, the color temperature of the illumination beam 70 formed by the illumination system 800, the illumination system 900, the illumination system 1000, the illumination system 1100, the illumination system 1200A, the illumination system 1200B, the illumination system 1300A, and the illumination system 1300B in the first illumination mode is greater than the color temperature of the illumination beam 70 formed in the second illumination mode. Conversely, when the intensity of the first portion 50B1 of the first laser beam 50B in the first illumination mode is less than the intensity of the first portion 50B1 of the first laser beam 50B in the second illumination mode, the color temperature of the illumination beam 70 formed by the illumination system 800, the illumination system 900, the illumination system 1000, the illumination system 1100, the illumination system 1200A, the illumination system 1200B, the illumination system 1300A, and the illumination system 1300B in the first illumination mode is less than the color temperature of the illumination beam 70 formed in the second illumination mode.

In this way, in the embodiments of FIG. 8 to FIG. 13B, the illumination system 800, the illumination system 900, the illumination system 1000, the illumination system 1100, the illumination system 1200A, the illumination system 1200B, the illumination system 1300A, and the illumination system 1300B may also control the arrangement and movement of the first light splitting region R1 and the second light splitting region R2 of the light splitting module 130 and the light splitting module 430 for adjusting a proportion of the first portion 50B1 and the second portion 50B2 of the first laser beam 50B through the light splitting module 130 and the light splitting module 430, so as to adjust a relative proportion of the first color light 70B1 and the second color light 70G2 of the illumination beam 70, or adjust the proportion of the first portion 50B1 and the second portion 50B2 of the first laser beam 50B through the light splitting module 130 and the light splitting module 430 by applying the arrangement and movement of the first light splitting region R1 and the second light splitting region R2 of the light splitting modules 230B, 230C, 230D and 230E of FIG. 2B to FIG. 2E. Therefore, the illumination system 800, the illumination system 900, the illumination system 1000, the illumination system 1100, the illumination system 1200A, the illumination system 1200B, the illumination system 1300A, and the illumination system 1300B may also adjust a color temperature of the illumination beam 70 without adjusting the intensity of the first laser light source 110B or the second light source 110R, so as to avoid the loss of brightness of the display image, and achieve the advantages mentioned in the aforementioned illumination system 100. Moreover, when the illumination system 800, the illumination system 900, the illumination system 1000, the illumination system 1100, the illumination system 1200A, the illumination system 1200B, the illumination system 1300A, and the illumination system 1300B are applied to the projection apparatus 200, the projection apparatus 200 may also achieve the aforementioned effects and advantages, which are not repeated.

In summary, the embodiments of the disclosure have at least one of following advantages or effects. In the embodiments of the disclosure, the projection apparatus and the illumination system are capable of adjusting a proportion of the first portion and the second portion of the first laser beam through the configuration of the first light splitting region and the second light splitting region of the light splitting module, thereby adjusting a relative proportion of the blue light in the illumination beam. Therefore, the illumination system and the projection apparatus may adjust color temperatures of the illumination beam and the image beam without adjusting an intensity of the first laser light source or the second laser light source, so as to avoid losing brightness of the display image.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. An illumination system, configured to provide an illumination beam, and comprising a first laser light source, a wavelength conversion module, a light splitting module, and a light combining element, wherein:

the first laser light source is configured to provide a first laser beam;

the wavelength conversion module is located on a transmission path of the first laser beam, wherein the wavelength conversion module is a reflective wavelength conversion wheel, and a wavelength conversion material is formed into an O-ring shape on a circular substrate of the reflective wavelength conversion wheel; and the light splitting module is located on the transmission path of the first laser beam, wherein when the first laser beam is incident to the light splitting module, a first portion of the first laser beam penetrates through the light splitting module, a second portion of the first laser beam is reflected by the light splitting module, one of the first portion and the second portion of the first laser beam is guided by the light combining element to the reflective wavelength conversion wheel and is converted into a wavelength converted light beam by the wavelength conversion material, the wavelength converted light beam is reflected back to the light combining element, the other one of the first portion and the second portion of the first laser beam is transmitted to the light combining element, and the light splitting module has a first light splitting region and a second light splitting region, and the first light splitting region and the second light splitting region of the light splitting module respectively intersect the transmission path of the first laser beam, such that the illumination system is correspondingly switched to a first illumination mode and a second illumination mode, in the first illumination mode, the first light splitting region intersects the transmission path of the first laser beam, so that the first laser beam is incident to the first light splitting region to form a first proportion of the first portion and the second portion, and in the second illumination mode, the second light splitting region intersects the transmission path of the first laser beam, so that the first laser beam is incident to the second light splitting region to form a second proportion of the first portion and the second portion, and the first proportion and the second proportion are different, wherein the wavelength conversion module may be asynchronous with the first laser light source.

2. The illumination system as claimed in claim 1, wherein the light splitting module further comprises a light splitting element, the first light splitting region and the second light splitting region are located on the light splitting element, the light splitting element is adapted to be moved, such that the first light splitting region and the second light splitting region of the light splitting module are switched to intersect the transmission path of the first laser beam.

3. The illumination system as claimed in claim 2, wherein the light splitting element is moved along a first straight line direction, and the first light splitting region and the second light splitting region are arranged along the first straight line direction.

4. The illumination system as claimed in claim 2, wherein the light splitting element is rotated around a central axis, and the first light splitting region and the second light splitting region are arranged along a circumferential direction where the central axis is taken as a center.

5. The illumination system as claimed in claim 2, wherein the first portion of the first laser beam penetrates through the light splitting element to form first color light, the second portion of the first laser beam is reflected by the light splitting element and is transmitted to the wavelength conversion module to form second color light, and an intensity of the first portion of the first laser beam in the first illumination mode is greater than or less than an intensity of the first portion of the first laser beam in the second illumination mode.

6. The illumination system as claimed in claim 5, wherein the first laser beam is incident on different positions of the light splitting elements during a process of gradually moving from the first light splitting region of the light splitting element to the second light splitting region, the intensity of the first portion of the first laser beam is gradually decreased or increased.

7. The illumination system as claimed in claim 2, wherein the first portion of the first laser beam penetrates through the light splitting element and is transmitted to the wavelength conversion module to form first color light, the second portion of the first laser beam is reflected by the light splitting element to form second color light, and an intensity of the second portion of the first laser beam in the first illumination mode is greater than or less than an intensity of the second portion of the first laser beam in the second illumination mode.

8. The illumination system as claimed in claim 7, wherein the first laser beam is incident on different positions of the light splitting elements during a process of gradually moving from the first light splitting region of the light splitting element to the second light splitting region, the intensity of the second portion of the first laser beam is gradually decreased or increased.

9. The illumination system as claimed in claim 1, wherein the light splitting module further comprises a polarization light splitting element and a phase delay element, the first light splitting region and the second light splitting region are located on the phase delay element, and the phase delay element is adapted to be rotated, such that the first light splitting region and the second light splitting region are switched to enter the transmission path of the first laser beam.

10. The illumination system as claimed in claim 9, wherein after the first laser beam passes through the phase delay element, a polarization state of the first portion of the first laser beam is orthogonal to a polarization state of the second portion of the first laser beam, the first portion of the first laser beam penetrates through the polarization light splitting element, and the second portion of the first laser beam is reflected by the polarization light splitting element.

11. An illumination control method, configured to control an illumination system in a projection apparatus, wherein the illumination system comprises a first laser light source, a light splitting module, and a light combining element, the first laser light source is configured to provide a first laser beam, wherein the wavelength conversion module is a reflective wavelength conversion wheel, and a wavelength conversion material is formed into an O-ring shape on a circular substrate of the reflective wavelength conversion wheel, the light splitting module is located on a transmission path of the first laser beam and has a first light splitting region and a second light splitting region, wherein when the first laser beam is incident to the light splitting module, a first portion of the first laser beam penetrates through the light splitting module, and a second portion of the first laser beam is reflected by the light splitting module, one of the first portion and the second portion of the first laser beam is guided by the light combining element to the reflective wavelength conversion wheel and is converted into a wavelength converted light beam by the wavelength conversion material, the wavelength converted light beam is reflected back to the light combining element, the other one of the first portion and the second portion of the first laser beam is transmitted to the light combining element, the illumination control method comprising:

in a first illumination mode, controlling the first light splitting region of the light splitting module to intersect the transmission path of the first laser beam, so that the first laser beam is incident to the first light splitting region to form a first proportion of the first portion and the second portion; and in a second illumination mode, controlling the second light splitting region of the light splitting module to intersect the transmission path of the first laser beam, so that the first laser beam is incident to the second light splitting region to form a second proportion of the first portion and the second portion, wherein the first proportion and the second proportion are different, and wherein the wavelength conversion module may be asynchronous with the first laser light source.

12. The illumination control method as claimed in claim 11, wherein the light splitting module comprises a light splitting element, the first light splitting region and the second light splitting region are located on the light splitting element, and the illumination control method further comprises:

making the light splitting element to move, such that the first light splitting region and the second light splitting region of the light splitting module are switched to intersect the transmission path of the first laser beam.

13. The illumination control method as claimed in claim 12, wherein a method of making the light splitting element to move comprises:

controlling the light splitting element to move along a first straight line direction, wherein the first light splitting region and the second light splitting region are arranged along the first straight line direction.

14. The illumination control method as claimed in claim 12, wherein a method of making the light splitting element to move comprises:

controlling the light splitting element to rotate along a central axis, wherein the first light splitting region and the second light splitting region are arranged around a circumferential direction where the central axis is taken as a center.

15. The illumination control method as claimed in claim 12, wherein the first portion of the first laser beam penetrates through the light splitting element to form first color light, the second portion of the first laser beam is reflected by the light splitting element and transmitted to the wavelength conversion module to form second color light, and an intensity of the first portion of the first laser beam in the first illumination mode is greater than or less than an intensity of the first portion of the first laser beam in the second illumination mode.

16. The illumination control method as claimed in claim 15, wherein the first laser beam is incident on different positions of the light splitting elements during a process of gradually moving from the first light splitting region of the light splitting element to the second light splitting region, the intensity of the first portion of the first laser beam is gradually decreased or increased.

17. The illumination control method as claimed in claim 12, wherein the first portion of the first laser beam penetrates through the light splitting element and is transmitted to the wavelength conversion module to form first color light, the second portion of the first laser beam is reflected by the light splitting element to form second color light, and an intensity of the second portion of the first laser beam in the first illumination mode is greater than or less than an intensity of the second portion of the first laser beam in the second illumination mode.

18. The illumination control method as claimed in claim 17, wherein the first laser beam is incident on different positions of the light splitting elements during a process of gradually moving from the first light splitting region of the light splitting element to the second light splitting region, the intensity of the second portion of the first laser beam is gradually decreased or increased.

19. The illumination control method as claimed in claim 11, wherein the light splitting module further comprises a polarization light splitting element and a phase delay element, the first light splitting region and the second light splitting region are located on the phase delay element, and the illumination control method further comprises:

making the phase delay element to rotate, such that the first light splitting region and the second light splitting region are switched to enter the transmission path of the first laser beam.

20. The illumination control method as claimed in claim 19, wherein after the first laser beam passes through the phase delay element, a polarization state of the first portion of the first laser beam is orthogonal to a polarization state of the second portion of the first laser beam, the first portion of the first laser beam penetrates through the polarization light splitting element, and the second portion of the first laser beam is reflected by the polarization light splitting element.

21. A projection apparatus, comprising an illumination system, at least two light valves and a projection lens, wherein:

the illumination system is the illumination system as claimed in claim 1;

the at least two light valves are located on a transmission path of the illumination beam, and is configured to convert the illumination beam into an image beam; and the projection lens is located on a transmission path of the image beam and is configured to project the image beam out of the projection apparatus.

* * * * *